Patented Aug. 25, 1925.

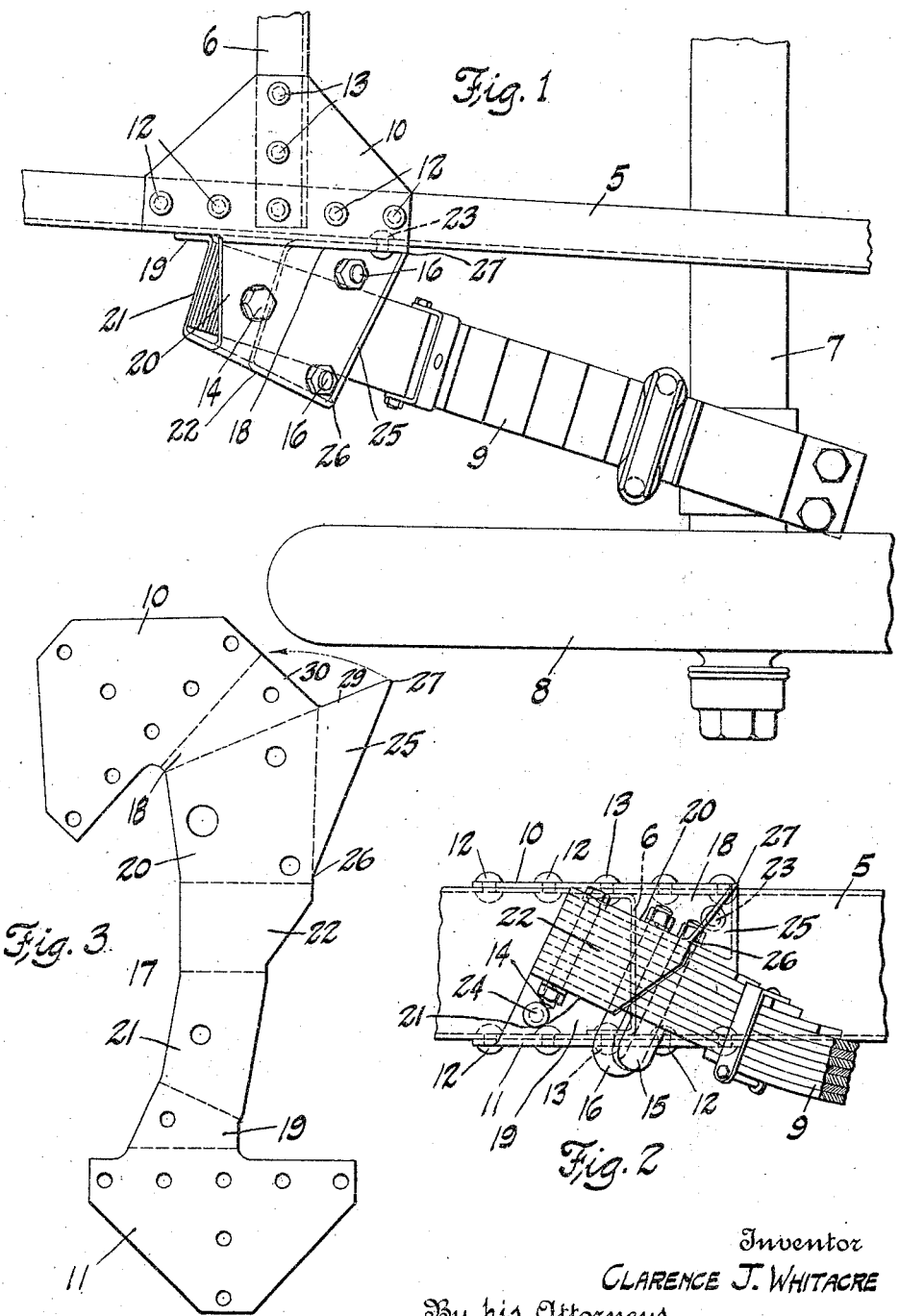

1,550,939

UNITED STATES PATENT OFFICE.

CLARENCE J. WHITACRE, OF DETROIT, MICHIGAN, ASSIGNOR TO GENERAL MOTORS CORPORATION, OF DETROIT, MICHIGAN, A CORPORATION OF DELAWARE.

SPRING-SUPPORTING BRACKET.

Application filed August 3, 1923. Serial No. 655,443.

*To all whom it may concern:*

Be it known that I, CLARENCE J. WHITACRE, a citizen of the United States, and a resident of Detroit, county of Wayne, and State of Michigan, have invented certain new and useful Improvements in Spring-Supporting Brackets, of which the following is a full, clear, concise, and exact description, such as will enable others skilled in the art to which the invention relates to make and use the same, reference being made therein to the accompanying drawings, which form a part of this specification.

My invention relates to spring supporting brackets designed to hold the fixed ends of springs of the class or type commonly referred to as quarter elliptic springs in proper position relative to the frame of an automobile, motor driven truck, or similar vehicle; and the principal object thereof is to provide a spring supporting bracket for the purpose stated and having structural features such that in addition to performing its function of supporting the fixed end of the spring aforesaid, said bracket will in addition act to brace the frame structure, thus materially enhancing the strength thereof; the bracket thus performing a double function and serving a double purpose when secured to the frame in the manner contemplated and performing its primary function of supporting the fixed end of a spring in a proper manner from and relative to the frame of the vehicle.

A further object of my invention is to provide a spring supporting bracket of the kind referred to which may be readily formed from a sheet metal blank of proper form cut from a metal plate or sheet, and bent and shaped into proper form, thereby providing a bracket which may be more readily manufactured and the cost of which is less than has heretofore commonly been the case; while at the same time the bracket thus produced has considerably greater strength for a given weight of material than is the case in cast metal brackets heretofore usually employed for spring supporting purposes.

With the above and other objects of invention in view my invention consists in the improved spring supporting bracket for quarter elliptic springs illustrated in the accompanying drawing and hereinafter described and explained; and in such variations and modifications thereof, within the scope of the concluding claims, as will be obvious to those skilled in the art to which my invention relates.

In the drawing accompanying and forming a part of the specification, and wherein the preferred embodiment of my invention is illustrated:

Figure 1 is a fragmentary view showing my improved spring supporting bracket and a part of a vehicle frame in plan.

Figure 2 is a similar view showing the bracket and frame in side elevation.

Figure 3 is a view showing, approximately, the shape of the flat sheet steel blank from which my improved spring supporting bracket is formed, by suitable bending and shaping operations performed thereupon.

Referring now to the drawing, the reference numeral 5 designates the left hand one of the two longitudinally extending side frame members commonly present in motor vehicle frames, 6 one of several transversely extending members the ends of which are secured to the side bars and which hold said members properly positioned relative to one another, 7 the rear axle, and 8 the left side rear driving wheel of the vehicle. The frame members are usually channel shaped in cross section, although their particular form is in no way involved in the invention to which this present application relates. The numeral 9 designates the left hand one of two quarter elliptic springs the free ends of which are fastened to the rear axle 7, and whereby the rear end of the frame is supported from said rear axle; said spring extending rearwardly from its supporting bracket and downwardly at an angle to the frame, as shown in Figure 2 and, in the embodiment of my invention illustrated, outwardly at an angle to said supporting bracket, as shown in Figure 1; although in some cases the spring, as seen in plan, extends straight back parallel with the longitudinal axis of the vehicle from the bracket whereby its front end is fixedly supported from the vehicle frame.

My improved spring supporting bracket comprises upper and lower substantially parallel triangular plates 10, 11 secured to the longitudinal frame member 5 by rivets 12, and to the transverse bar 6 by rivets 13; said rivets extending through the holes appearing in the plate portion of the blank shown in Figure 3 and through the upper and lower flanges of the channel shaped frame members, as will be understood.

The plates 10 and 11 are connected by an intermediate portion which is bent to provide a sort of hollow housing, recess, or box located to one side of the plates, and into which the front end of the spring 9 extends and within which it is fixedly held in any suitable way, as by means of a bolt 14 extending through walls of the receptacle and through the spring, and a saddle block 15 and U-shaped clip 16 the upper ends of the sides of which extend through holes in the top wall of the housing and are provided with nuts, as shown.

The particular shape of the intermediate connecting portion of the sheet steel blank from which the bracket is formed (which is designated as a whole by the numeral 17 in Figure 3) determines the angle at which the spring diverges outwardly, Figure 1, and downwardly, Figure 2, from the bracket as a fixed point of support; and, conversely, the angles fixed upon by the designer control as to the particular shape which said connecting portion shall have in order that the spring shall stand the angles decided upon in advance, after the blank shall have been bent and shaped to produce the finished bracket.

A blank of substantially the shape shown in Figure 3 will bend to produce a bracket substantially as illustrated in Figures 1 and 2; the parts 18, 19 of the blank (divided off by dotted lines) upon being bent substantially at right angles to the end plates 10, 11 providing substantially vertical walls extending from the outer edges of the upper and lower plates 10, 11 of the bracket toward one another designated by the reference numerals 18, 19 in the bracket, and which walls contact with the outer vertical side of the frame member 5. The portions 20, 21 of the blank upon being bent substantially at right angles to said parts 18, 19 provide similarly designated top and bottom walls of the housing within which the fixed end of the spring is held; while the section 22 of the blank which, during the bending process, takes up a position substantially at right angles to the top and bottom walls 20, 21 and connects their outer edges, forms the outer end wall of the housing which receives and holds the fixed end of the spring.

The vertical walls 18, 19 of the housing may, if deemed necessary to secure increased strength, be secured to the vertical web of the frame member 5 by rivets 23, 24; and the upper and lower plates 10, 11 may constitute the sole bracing at the joint between the longitudinal and transverse frame members 5, 6 or additional right angle braces not shown may be placed in the corner or corners where these members meet and secured to the vertical webs of said members by rivets or otherwise.

The offshoot portion 25 of the blank is for providing a brace for strengthening the housing for the fixed end of the spring against stresses tending to bend it upward, and may not be used if the bracket is sufficiently strong without it. During the bending and shaping operations to which the blank is subjected to form the finished bracket this portion 25 is made to assume a position substantially at right angles to the top wall 20 along the rear edge of which it extends with constantly increasing height from the outer edge of said wall at 26 to the point 27 contiguous, in the finished bracket, to the upper end of the rear edge of the vertical wall 18; and the free edge of said part 25 which, after the bending process has been completed, extends along the rear edge 30 of the vertical wall 18, is preferably welded to said wall along the meeting edges aforesaid; that is, along the edges 29, 30 which extend alongside one another after the completion of the bending and shaping process to which the blank is subjected.

Having thus described and explained my invention, I claim and desire to secure by Letters Patent:

1. A unitary single piece spring supporting bracket formed from a sheet metal blank by suitable bending and shaping operations, said bracket having substantially parallel upper and lower plates spaced apart from one another, and a hollow housing located to one side of said plates and having downwardly and outwardly inclined walls to thereby receive and support the fixed end of a spring of the vehicle extending downwardly and outwardly from said bracket.

2. A unitary single piece spring supporting bracket formed from a sheet metal blank by suitable bending and shaping operations, said bracket having substantially parallel upper and lower plates spaced apart from one another; and a hollow laterally disposed spring end holding housing comprising substantially vertical walls extending from the outer edges of said plates toward one another, downwardly inclined top and bottom walls extending outwardly from the adjacent edges of said vertical walls, and an outwardly inclined end wall extending between the outer edges of said top and bottom walls.

3. A unitary single piece spring supporting bracket formed from a sheet metal blank by suitable bending and shaping operations, said bracket having substantially parallel upper and lower plates spaced apart from one another; and a hollow laterally disposed spring end holding housing comprising substantially vertical walls extending from the outer edges of said plates toward one another, top and bottom walls extending outwardly from the adjacent edges of said vertical walls, an end wall extending between the outer edges of said top and bottom walls, and a brace integral with said top wall and between the same and the upper one of said vertically extending walls.

4. A unitary single piece spring supporting bracket formed from a sheet metal blank by suitable bending and shaping operations, said bracket having substantially parallel upper and lower plates spaced apart from one another; and a hollow laterally disposed spring end holding housing comprising substantially vertical walls extending from the outer edges of said upper and lower plates toward one another, downwardly inclined top and bottom walls extending outwardly from the adjacent edges of said vertical walls, an outwardly inclined end wall extending between the outer edges of said top and bottom walls, and a triangular brace integral with the top wall aforesaid and extending upward from the rear edge thereof and along the rear edge of the upper one of said vertically extending walls.

In testimony whereof I affix my signature.

CLARENCE J. WHITACRE.